United States Patent
Boustani et al.

(10) Patent No.: US 7,472,779 B2
(45) Date of Patent: Jan. 6, 2009

(54) CHUTE TRANSITION FRAME AND CHUTE SYSTEM INCORPORATING THE SAME

(75) Inventors: Hadi C. Boustani, Bethesda, MD (US); Howard T. Ayres, Hughsville, MD (US)

(73) Assignee: Chazem Manufacturing, LLC, White Plains, MD (US)

( * ) Notice: Subject to any disclaimer, the term of this patent is extended or adjusted under 35 U.S.C. 154(b) by 9 days.

(21) Appl. No.: 11/272,935

(22) Filed: Nov. 14, 2005

(65) Prior Publication Data

US 2006/0102712 A1 May 18, 2006

Related U.S. Application Data

(60) Provisional application No. 60/627,314, filed on Nov. 12, 2004.

(51) Int. Cl.
*B65G 11/10* (2006.01)
(52) U.S. Cl. ........................ 193/2 A; 193/25 C; 193/30; 193/33; 193/2 R; 232/44
(58) Field of Classification Search .................. 232/44; 193/2 A, 25 R, 25 C, 30, 33, 2 R
See application file for complete search history.

(56) References Cited

U.S. PATENT DOCUMENTS

| | | | | |
|---|---|---|---|---|
| 158,567 A * | 1/1875 | Bass | ........................... | 193/30 |
| 455,328 A * | 7/1891 | Herbert | ........................ | 193/30 |
| 753,616 A * | 3/1904 | Nicholson | .................... | 138/107 |
| 2,772,764 A * | 12/1956 | McClellan | ...................... | 193/4 |
| 3,428,159 A * | 2/1969 | Klingner et al. | ............. | 400/292 |
| 5,248,344 A * | 9/1993 | Hoppe | ........................ | 134/25.3 |
| 5,409,211 A * | 4/1995 | Adamek | ...................... | 473/433 |
| 5,472,768 A * | 12/1995 | Anson | ......................... | 428/131 |
| 5,800,112 A * | 9/1998 | Stafford | ................... | 414/141.8 |
| 7,036,647 B2 * | 5/2006 | Malmberg | ................ | 193/25 C |

FOREIGN PATENT DOCUMENTS

| | | | | |
|---|---|---|---|---|
| DE | 3605045 A1 * | 8/1987 | .................. | 193/30 |
| JP | 54051170 A * | 4/1979 | .................. | 193/30 |

* cited by examiner

*Primary Examiner*—Mark A Deuble
(74) *Attorney, Agent, or Firm*—Sand & Sebolt

(57) ABSTRACT

A transition frame and a chute system incorporating the same. The frame includes two first chain connectors and three second chain connectors which are positioned in different configurations on the frame. The frame defines a central opening through which at least a portion of a chute section is receivable. The first and second chain connectors allow chains to be attached to the transition frame to connect the chute to a support system or to connect different types of chute sections together. If the chute is formed from a plurality of molded sections and rolled sections, the frame can be oriented in such a manner so as to allow at least two chains to extend between the frame and the molded sections and at least three chains to extend between the frame and the rolled sections. The frame can be inverted as required to allow the molded sections to be positioned above or below the rolled sections. The frame can also be utilized to connect support chains between a support system and a column of rolled sections only or molded sections only.

6 Claims, 11 Drawing Sheets

CHUTE TRANSITION FRAME AND CHUTE SYSTEM INCORPORATING THE SAME

CROSS-REFERENCE TO RELATED APPLICATIONS

This is a standard utility application claiming priority from U.S. Provisional Application Ser. No. 60/627,314, filed Nov. 12, 2004, the entire disclosure of which is incorporated herein by reference.

BACKGROUND OF THE INVENTION

1. Technical Field

This invention generally relates to chute systems. More particularly, the invention relates to a construction-type chute system that is secured to a supporting structure. Specifically, the invention relates to a transition frame for a chute system that enables both molded chute systems and rolled chute systems to be combined.

2. Background Information

The use of chutes to convey material from one point to another is well known in the prior art. Typically chutes are used to establish a path for materials to flow from a higher elevation to a lower elevation. Some chutes are built as part of a building to transport garbage or linen. Other types of chutes are temporarily mounted to the exterior of a structure to handle debris from construction to renovation.

The externally mounted chutes are made of both metal and plastic. The metal chutes have a rectangular or round cross-section. For a chute that is comparatively tall, the weight of the chute can be significant. The metal chute has enough strength to be self-supporting. Additional bracing can be added to turns or bends in the chute, but for straight length, the metal chute is a self-sustaining structure. The chutes are usually composed of sections that are fastened together to make one continuous chute at the site in order to facilitate transport, storage and erection of the system.

Plastic chutes are used as a less expensive and lighter alternative. Again, the plastic chutes come in sections that can be connected together on the site. One type of plastic molded section comprises a molded cylindrical shape with ribs or other stiffening that is integral with the molded piece. Plastic does not have the stiffness or strength of the steel chutes and requires a secondary support. This secondary support often consists of chains suspended from a frame or outrigger secured to a building parapet wall, a building roof, scaffolding or through a window opening. Steel chains connect from the support frame to each plastic section along the length of the chute. Each plastic section has a bracket or hook to accept a chain connection. Typically, two chains are used to support the column of plastic chute. The resulting chute weight is supported by the lengths of chain that are interconnected. The cylindrical plastic sections serve only to create an enclosed path for the materials placed in the chute. Some plastic sections are designed with a taper so that they can be inserted into one another upon assembly instead of fastening the ends together to eliminate gaps between sections. The chain connection maintains the desired spacing of each section. An assembled plastic chute maintains some flexibility since the support is provided by flexible chain and each section is not rigidly connected to any other section. This flexibility can be beneficial for handling the impact of moving material.

A variation on the molded cylindrical section is a flat sheet of plastic that is rolled and fastened to a splice strip to form a cylindrical section. This offers a significant advantage in terms of transportation. The molded cylinders have a rigid shape and a significant volume while the flat sheets can be transported in a stack and can be formed into cylindrical sections at the job site. The rolled sheet molded sections are supported from frames or outriggers by successively connected chains in a similar manner to the molded cylinders. The primary difference in the two systems is that the rolled sheet systems require more than two chains for support. If a column of rolled sheet section is supported by only two chains, the rolled sheet tends to collapse or flattened. In the molded plastic system, molded ribs and stiffeners help the column maintain its intended shape with only a two-chain support.

Typically, an end user of plastic chutes will use either the molded plastic or rolled plastic systems but not both because of the different chain support configurations. Often, the chute fabricator will provide outriggers and support frames designed specifically for the number of chains required by the specific system. Heretofore, there has not been a device or a method for combining the two systems. There are instances where a contractor may have both molded and flat sheet systems and may wish to combine them to extend the length of a chute column. Alternatively, a contractor may have a single set of outriggers and support frame that he wants to use for all of his chute systems. The existing systems do not provide a means of combining the two chain and multiple chain supports.

The foregoing challenges and design considerations, as well as others, are addressed by the present invention of a chain connection conversion frame.

SUMMARY OF THE INVENTION

Consistent with the foregoing objects, and in accordance with the invention as embodied and broadly described herein, a transition frame and a chute system incorporating the same is disclosed. The transition frame has a first plurality of chain connectors and a second plurality of chain connectors. The first and second connectors differ in number and in their configuration on the frame. Specifically there are two first connectors and three second connectors. The frame defines a central opening therein and is configured to allow at least a portion of a chute section to pass through the opening. The first and second chain connectors allow chains to be attached to the transition frame to connect the chute to a support system or to connect different types of chute sections together. The transition frame may be used to connect molded chute sections to rolled chute sections. If the molded sections are disposed above the rolled sections in the chute system, the transition frame is oriented so that the two first connectors extend upwardly from the frame and the three second connectors extend downwardly therefrom. This allows for two chains to be connected between the molded sections and the transition frame and three chains to be connected between the transition frame and the rolled sections. Alternatively, if the rolled sections are to be disposed above the molded sections in the chute system, the transition frame is inverted so that the three second connectors extend upwardly from the frame and the two first connectors extend downwardly from the frame. This allows for three chains to secure the rolled sections and frame together and two chains to secure the molded sections and the frame together. The transition frame may also be used to connect the support system directly to a column consisting entirely of molded sections or to a column consisting entirely of rolled sections.

BRIEF DESCRIPTION OF THE DRAWINGS

The preferred embodiments of the invention, illustrative of the best mode in which applicant has contemplated applying the principles, are set forth in the following description and are shown in the drawings and are particularly and distinctly pointed out and set forth in the appended claims.

DETAILED DESCRIPTION OF THE INVENTION

It will be readily understood that the components of the present invention, as generally described and illustrated in the Figures herein, could be arranged and designed in a wide variety of different configurations. The following more detailed description of the present invention is not intended to limit the scope of the present invention, as claimed, but is merely the preferred embodiment of the invention.

Figure 1:
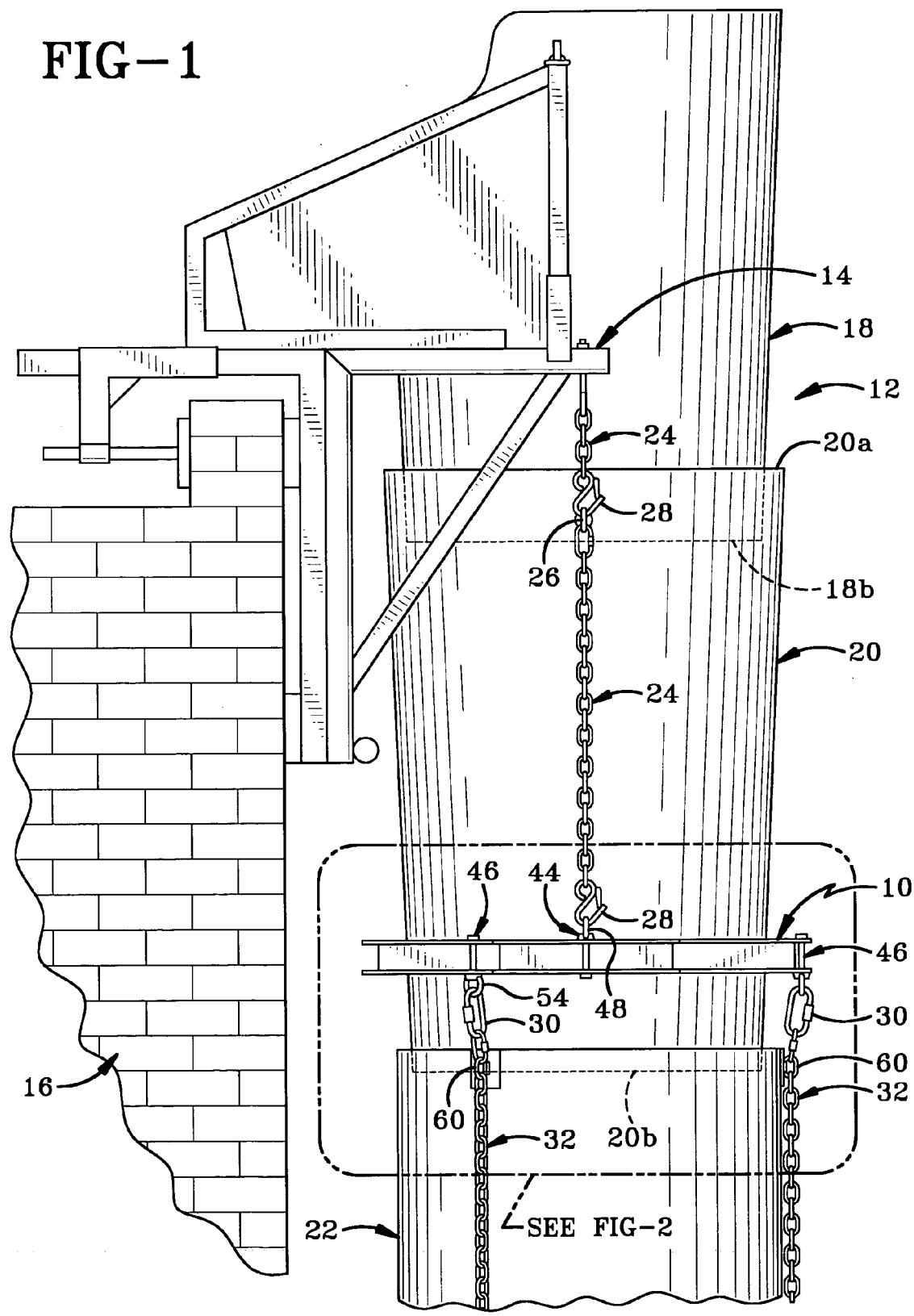
FIG. 1 is a side elevational view of a chute system incorporating the chute transition frame of the present invention.

Referring to FIGS. 1-7, there is shown a chute transition frame in accordance with the present invention and generally indicated at 10. Transition frame 10 is used in conjunction with a chute system, generally indicated at 12, which is adapted to be connected via a support system 14 to one of a building parapet wall 16 (as shown in FIG. 1) or to a roof (not shown), window opening (not shown) or to a scaffold (not shown). Various other components such as winches, connection bars, counterweights, for example, can also be incorporated into the chute system 12.

Chute system 12 includes at least one intake hopper 18 connected to the support system 14 and one or more molded sections 20 connected to support system 14 or hopper 18. Molded sections 20 are well known in the art and are manufactured from plastic or rubber and are wider at a top end 20a and narrower at a bottom end 20b. The taper facilitates the connection of one molded section 20 to subsequent molded sections by allowing them to sleeve into each other and to thereby form a connected column of molded sections.

Typically, a top rib (not shown) strengthens the top end 20a of each molded section and a bottom rib (not shown) strengthens the bottom end 20b of the same. Hopper 18 is manufactured in a similar manner so that a lower end 18b thereof is received within top end 20a of the uppermost molded section 20. Molded sections 20 maintain their shape, but because they lack the strength and rigidity of steel molded sections, they have to be supported in position by chains as will be hereinafter described.

The molded sections 20 are connected to the support structure 14 or to the hopper 18 by way of a pair of chains 24. Chains 24 are disposed on opposite sides of molded section 20. Only two chains 24 are required to support molded section 20 in place as the molded sections 20 are fairly rigid structures that maintain their shape at all times. Although not illustrated in the attached drawings, when chute system 12 includes two or more molded sections 20, adjacent pairs of molded sections 20 are connected to each other by chains 24. Each molded section 20 includes a pair of eyenuts 26 to which chains 24 are hooked by way of a suitable connector, such as a S-hook 28 or snap-latch hooks (not shown). Chains 24 are connected to hopper 18 or support system 14 by a picking chain as is well known in the industry. The lower ends of chains 24 are connected to transition frame 10 by S-hooks 28.

In accordance with a specific feature of the present invention, chute system 12 may additionally include one or more rolled sections 22 that are connected to molded sections 20 or to support system 14 by way of the transition frame 10. Rolled sections 22 are manufactured as flat plastic sheets that are rolled at the job site into a cylindrical shape and are then secured in that shape by a suitable connection means such as a splice plate 23. The absence of support ribs in rolled sections 22 means these sections cannot be supported or maintain their cylindrical shape unless they are suspended from three or more chains. A second plurality of chains 32 are therefore used to connect transition frame 10 to rolled sections 22. In the preferred embodiment of the invention, three chains 32 are used to connect rolled sections 22 to a transition frame 10 and two chains 24 are used to connect the transition frame 10 to one of a molded section 20 or to the support system 14. The three chains 32 help rolled sections 22 maintain their cylindrical shape. Molded sections 20 are able to maintain their own shape and consequently only two chains are needed to secure molded sections 20 to the transition frame 10.

A chute transition frame 10 in accordance with the present invention is shown in detail in FIGS. 2-5. Frame 10 preferably is comprised of a plurality of members 34 that are welded or otherwise secured together. The resulting frame is consequently substantially rigid. In the preferred embodiment of the invention, frame 10 is octagonal in shape and members 34 are generally C-shaped in cross-section. It will be understood, however, that frame 10 may be circular (FIG. 3a), rectangular (not shown) or any other polygonal shape convenient for the fabrication thereof. Likewise, the cross-sectional shape of the members 34 may be varied without departing from the spirit of the present invention. Frame 10 defines a central opening 36 therein. Opening 36 is sufficiently large enough to allow at least a portion of a molded section 20 or rolled section 22 (FIG. 1) to pass therethrough. Furthermore, the opening 36 may be octagonal, circular, rectangular, square or any other polygonal shape without departing from the spirit of the present invention. It will further be understood that the shape of frame 10 and the opening 36 defined therein do not have to be identical.

Figure 4:
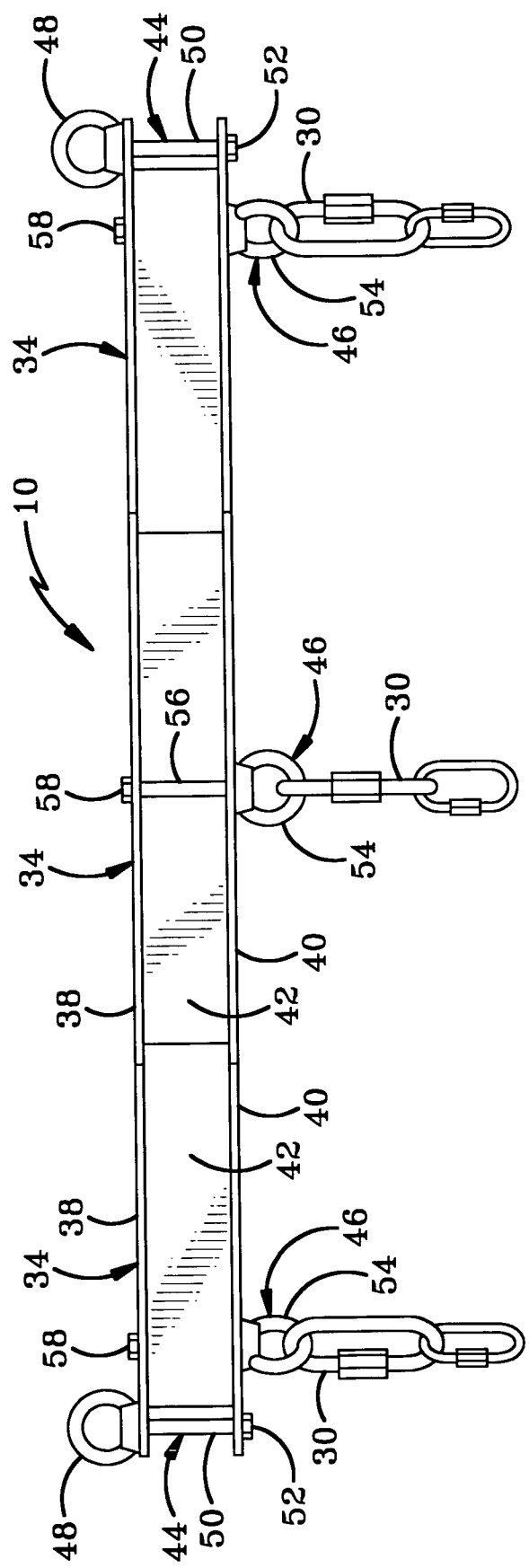
FIG. 4 is a side view of the chute transition frame.

Each member 34 of frame 10 includes a first wall 38 and a second wall 40 connected together by an intermediate wall 42. Frame 10 includes a plurality of first connectors 44 and second connectors 46. In the preferred embodiment of the invention, two first connectors 44 extend upwardly and outwardly away from the first wall 38 and three second connectors 46 extend downwardly and outwardly away from the second wall 40. As best seen in FIG. 4, each of the first connectors 44 comprises an eyenut having an eyenut portion 48, a bolt shaft 50 and a bolthead 52. Each of the second connectors 46 has an eyenut portion 54, a bolt shaft 56 and a bolthead 58.

Figure 2:
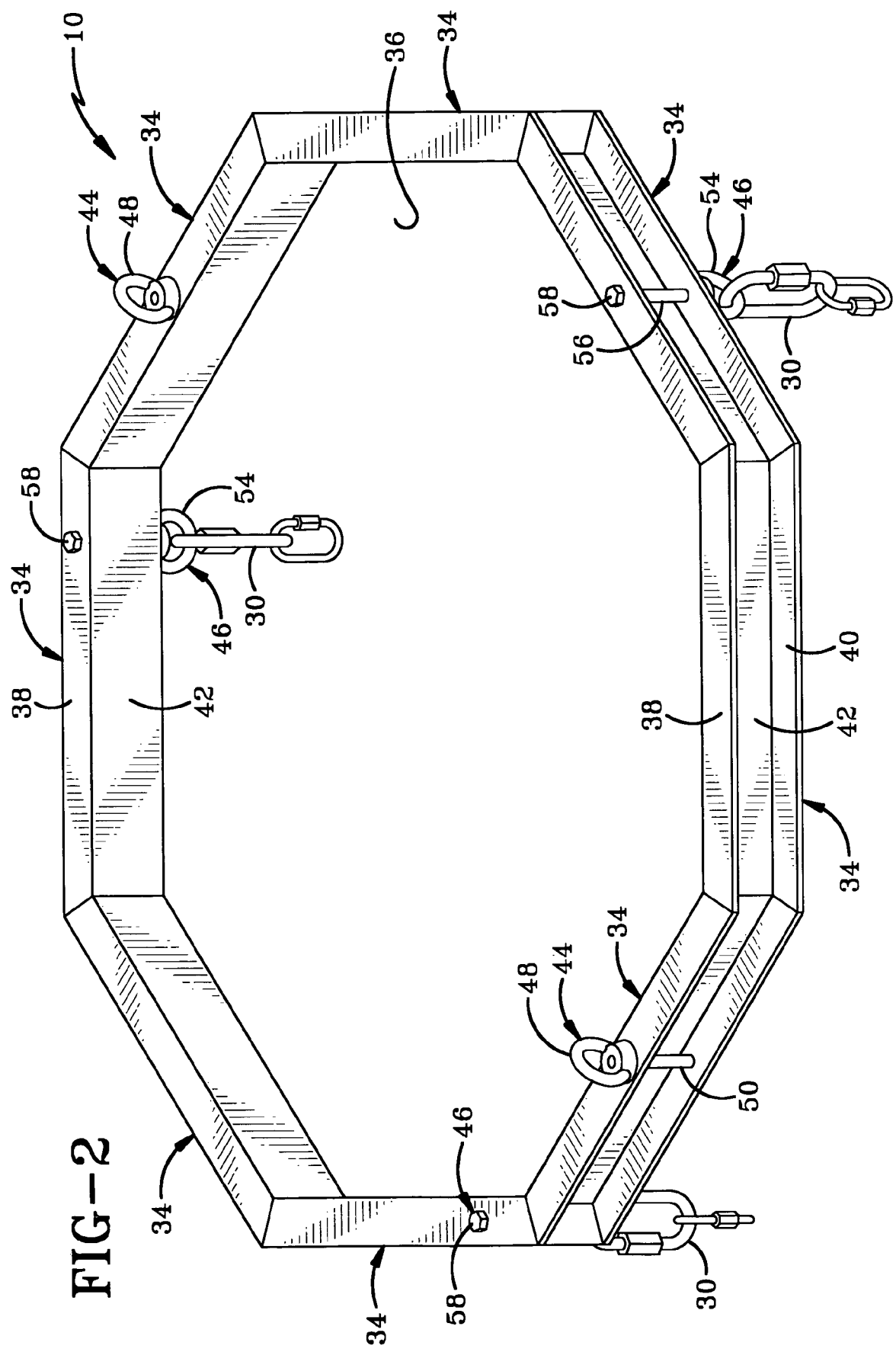
FIG. 2 is a perspective view of the chute transition frame of the present invention, and showing the top end of the second chains being secured thereto.
Figure 3:
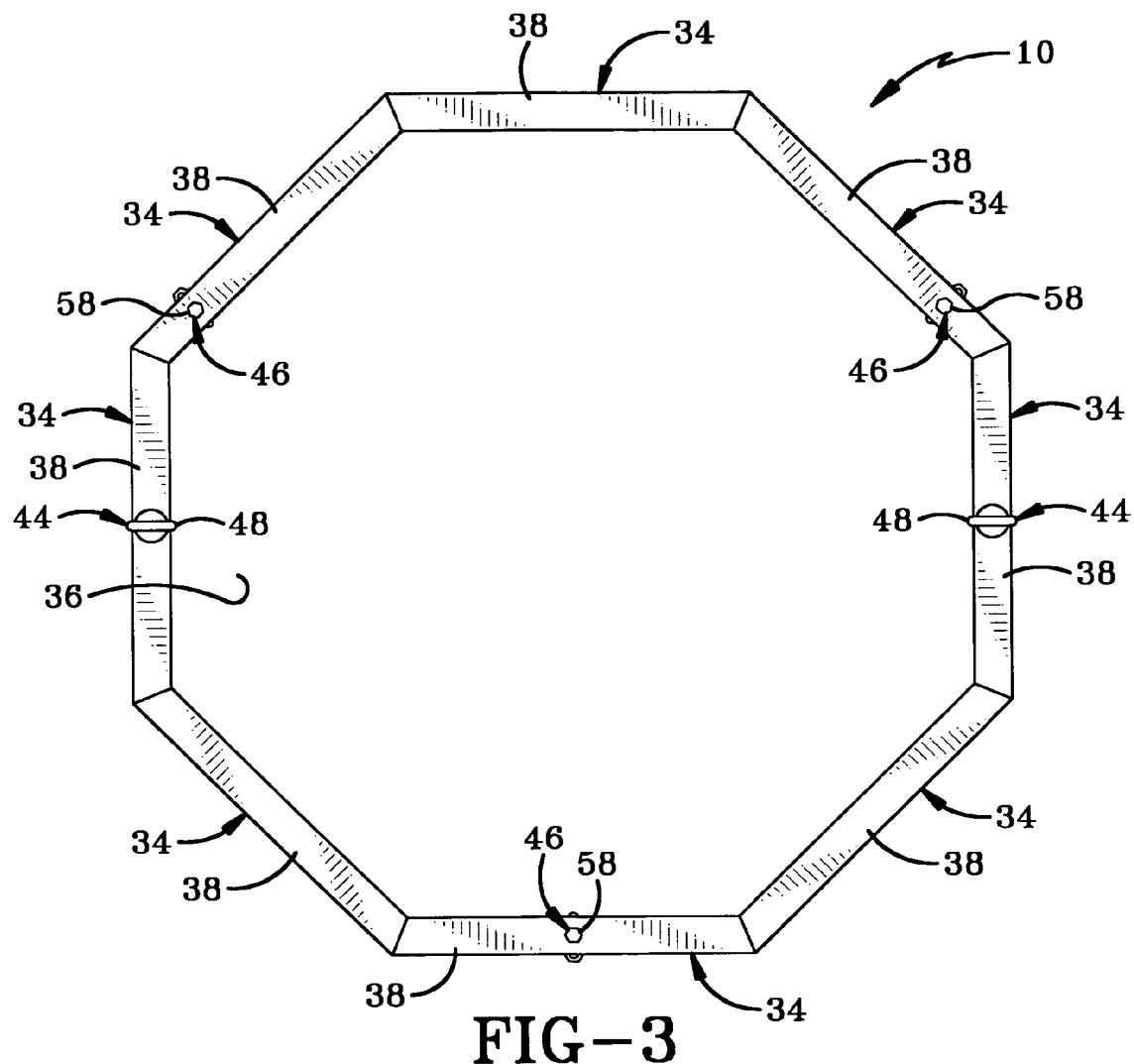
FIG. 3 is a top view of the chute transition frame.
Figure 3A:
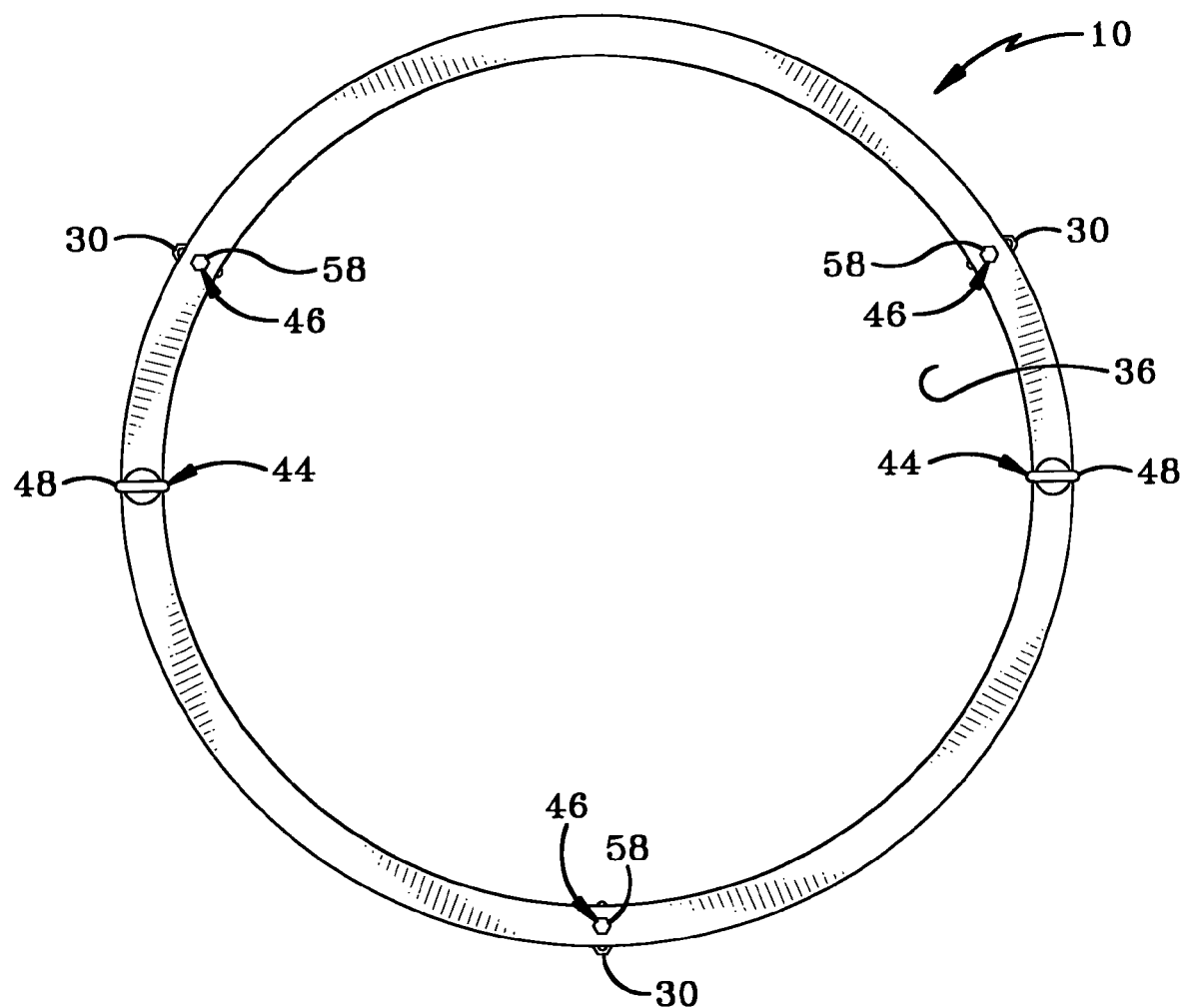
FIG. 3a is a top view of an alternatively shaped chute transition frame.
Figure 5:
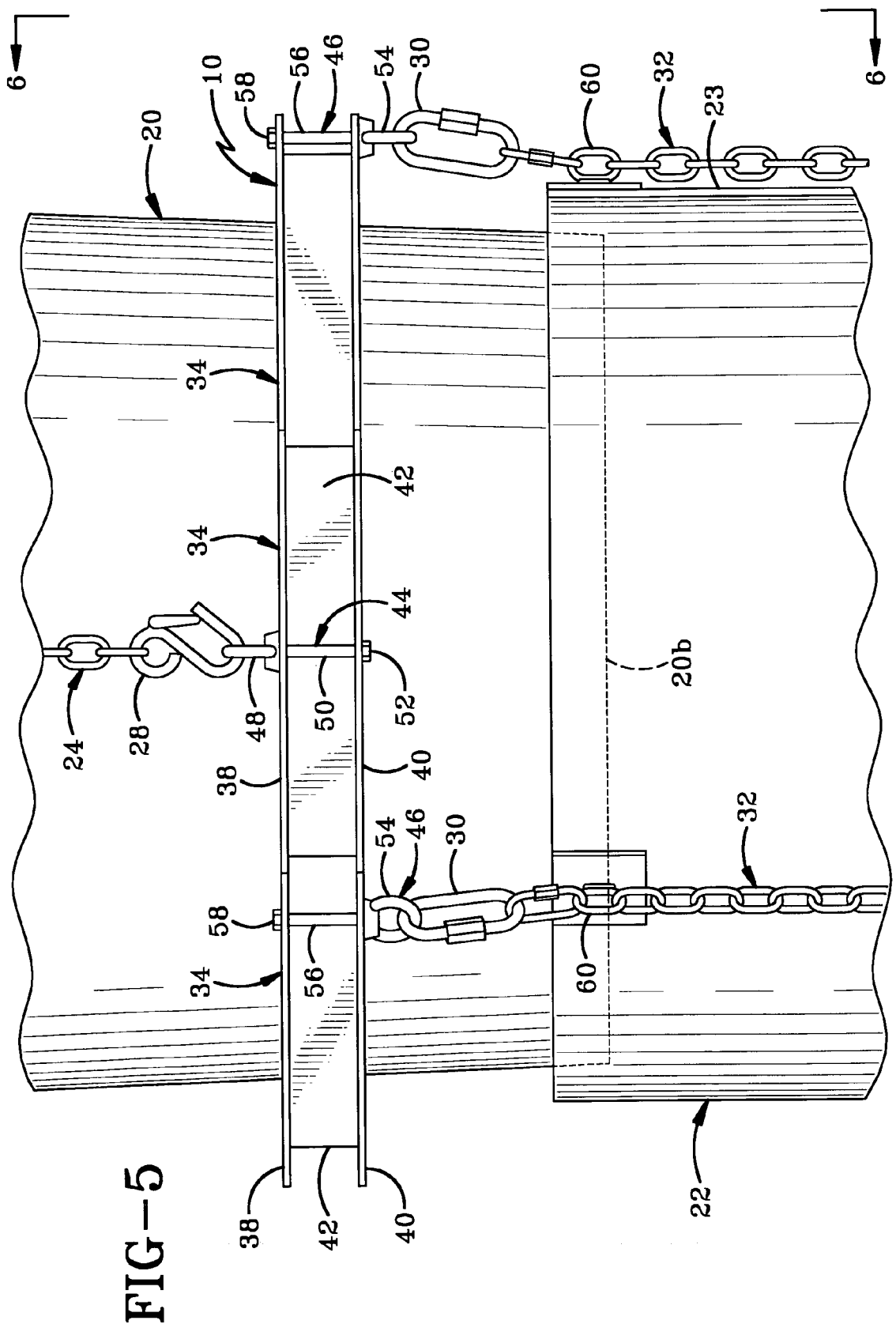
FIG. 5 is an enlarged side view of the chute transition frame shown connecting a molded section to a rolled section.
Figure 6:
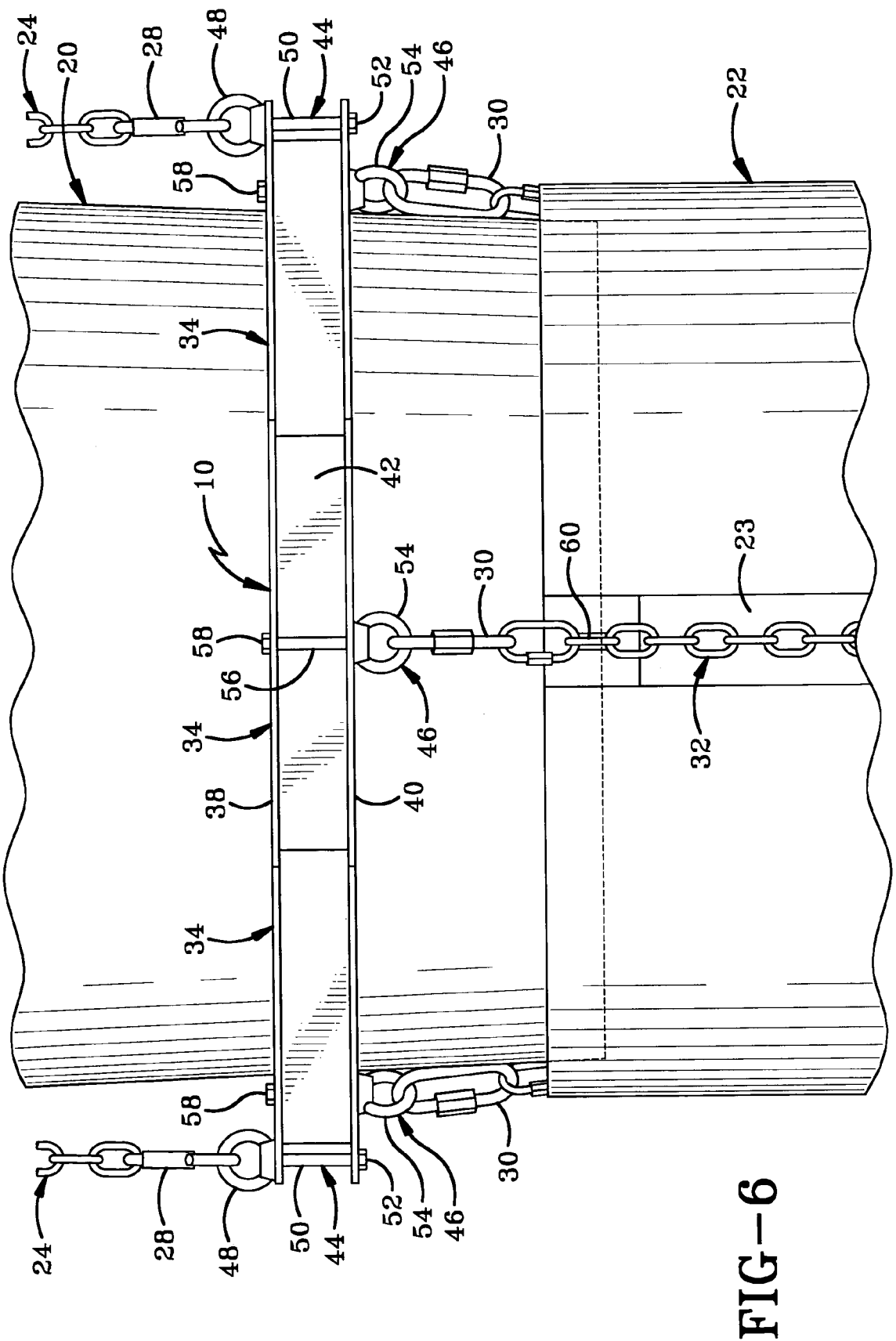
FIG. 6 is a front view of the chute transition frame through line 6-6 of FIG. 5.

Transition frame 10 is shown in use in FIGS. 1 & 5. In this instance, transition frame 10 is used to connect a molded section 20 to a rolled section 22. A first chain 24 is connected at a first end to each of the eyenuts 26 on molded section 20. A second end of chain 24 is connected to eyenut portion 48 of first connectors 44 on transition frame 10. Any suitable connection means may be utilized to secure chains 24 to molded section 20, such as S-hooks 28 or link connectors 30. Consequently, transition frame 10 is suspended on chains 24 which are secured to eyenuts 26 on molded section 20. Three chains 32 hang downwardly from transition frame 10 (FIG. 6) being secured thereto at a first end by second connectors 46. Chains 32 are each connected to an eyenut portion 54 of one of the respective second connectors 46 by a link connector 30. Chains 32 are each secured to an eyenut 60 disposed part way down the rolled section 22. Consequently, rolled section 22 is suspended from the three chains 32. Additional rolled sections 22 can be suspended by chains 32 from one of transition frame 10 and first rolled section 22a (FIG. 2). It should be understood that the number and/or configuration of chains connected to first wall 38 of frame 10 differs from the number and/or configuration of chains connected to second wall 40 of frame 10.

Once chute system 12 is installed on parapet wall 16, a worker can introduce debris into chute system 12 through an opening (not shown) in hopper 18. The debris drops through the successive molded sections 20 and rolled sections 22 and into a receptacle (not shown) that is positioned beneath the lowermost chute section or rolled section.

Figure 7:
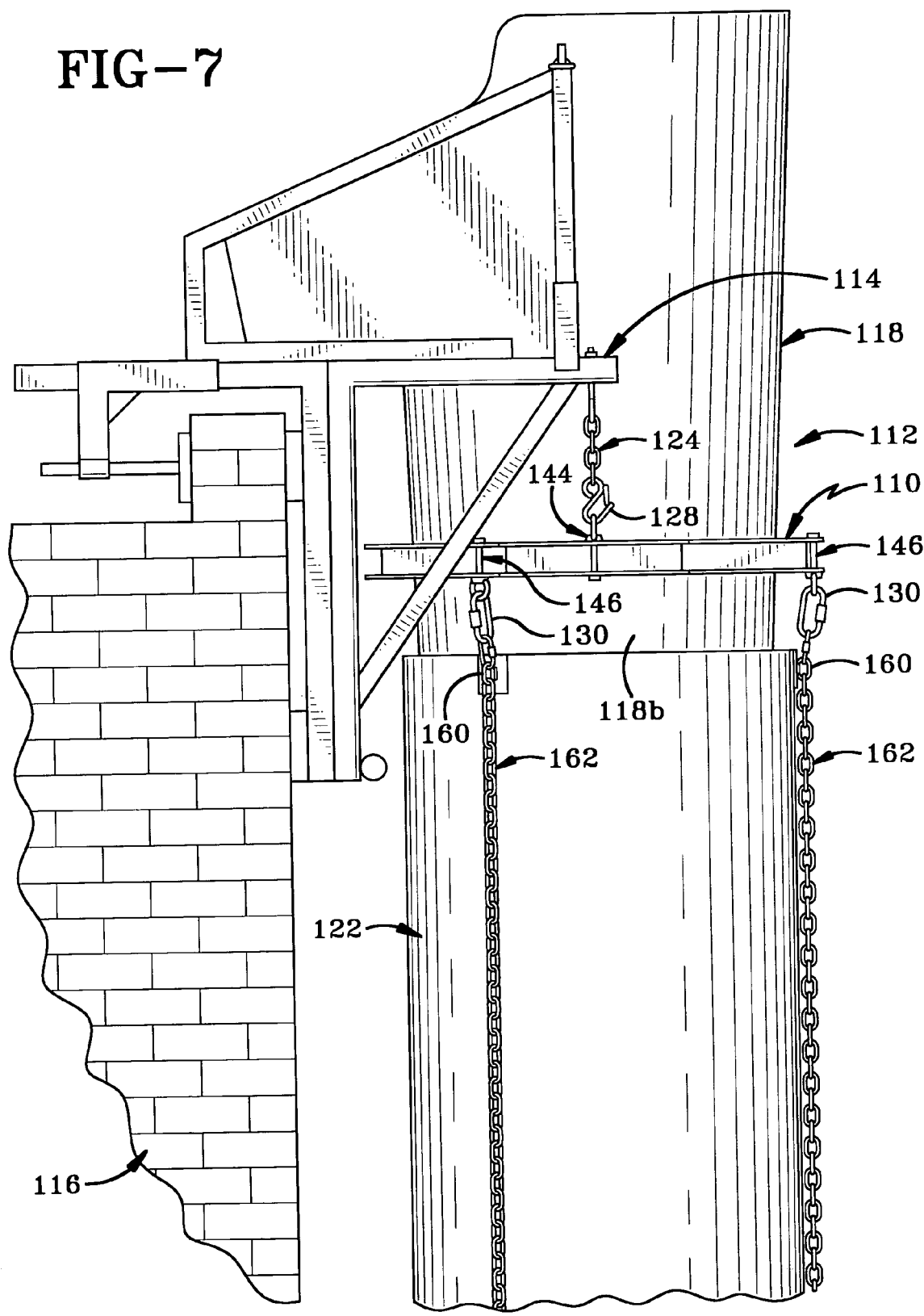
FIG. 7 is a side elevational view of a chute system showing the transition frame in use connecting a rolled section to a hopper.

FIG. 7 illustrates an instance where the chute system 112 is made up entirely from rolled sections 122 that are sleeved onto a bottom end 118b of a hopper 118. Hopper 118 is secured to a support system 114. Transition frame 110 is suspended from support frame 114 by a pair of chains 124 secured by an S-hook 128 to frame 114. S-hooks 128 connect to first connectors 144 on transition frame 110. Transition frame 110 is secured to plated links 160 on rolled section 122 by way of a link connector 130 secured to each of second connectors 146. Three second chains 162 extend downwardly from links 160. It will be understood that second chains 162 may be of a length sufficient to extend down the entire column of sleeved rolled sections 122 and to be clipped by link connectors or other suitable mechanisms to the plated links 160 disposed on the peripheral outer walls of each of the consecutive rolled sections 122.

Figure 8:
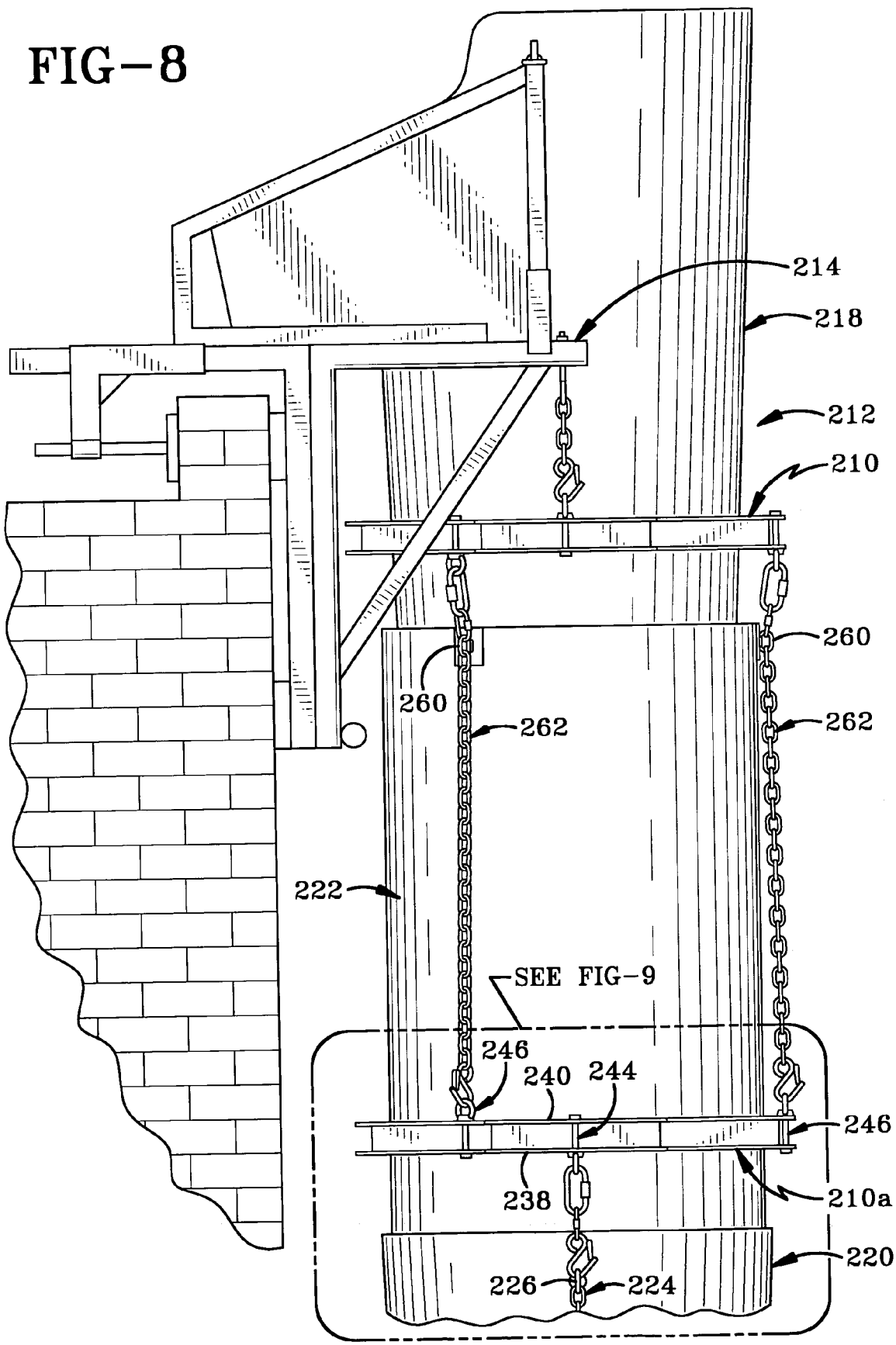
FIG. 8 is a side elevational view of a chute system showing two transition frames being used to connect an upper rolled section to a lower molded section.
Figure 9:
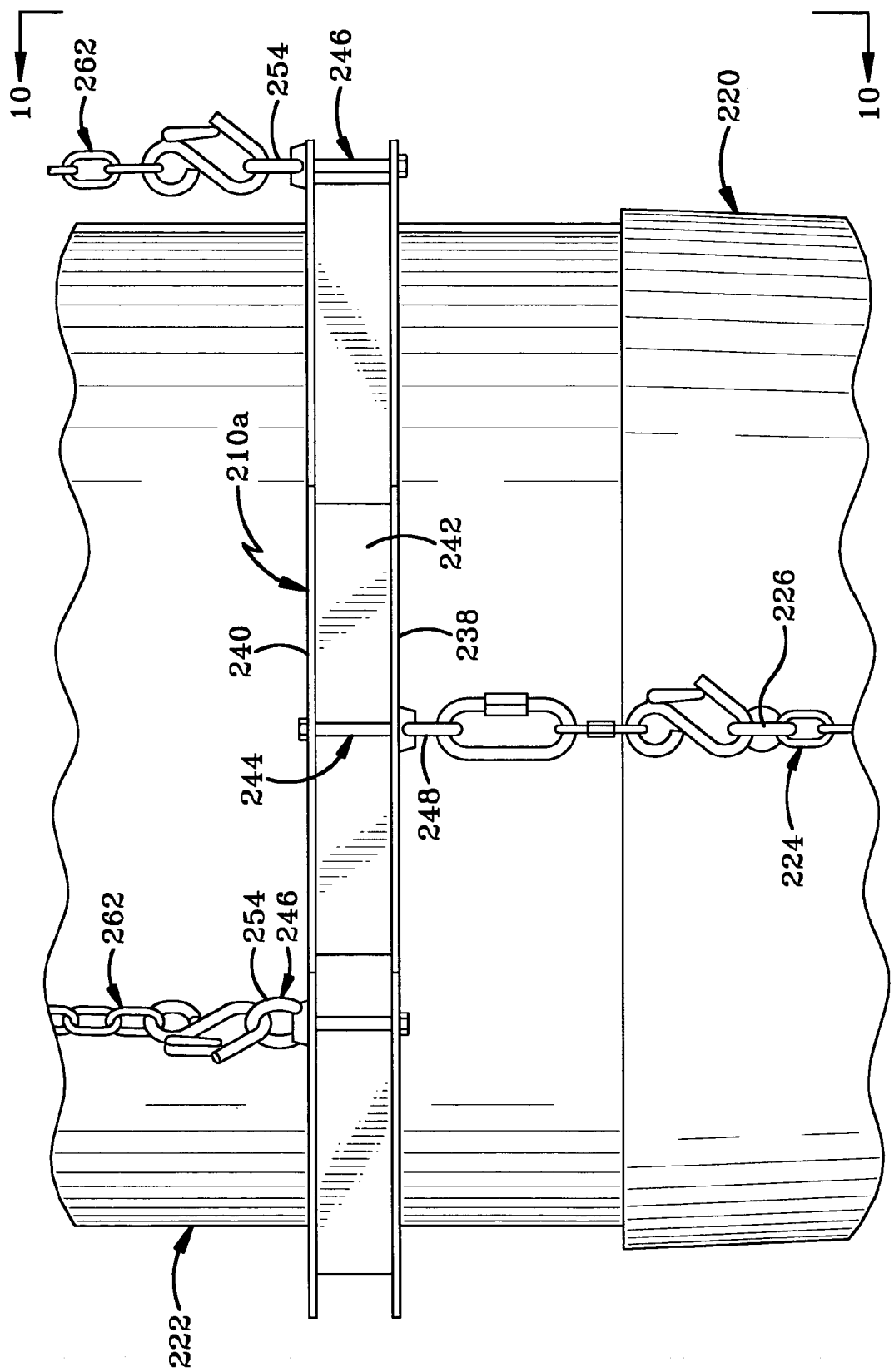
FIG. 9 is an enlarged side elevational view of the chute transition frame of FIG. 7.
Figure 10:
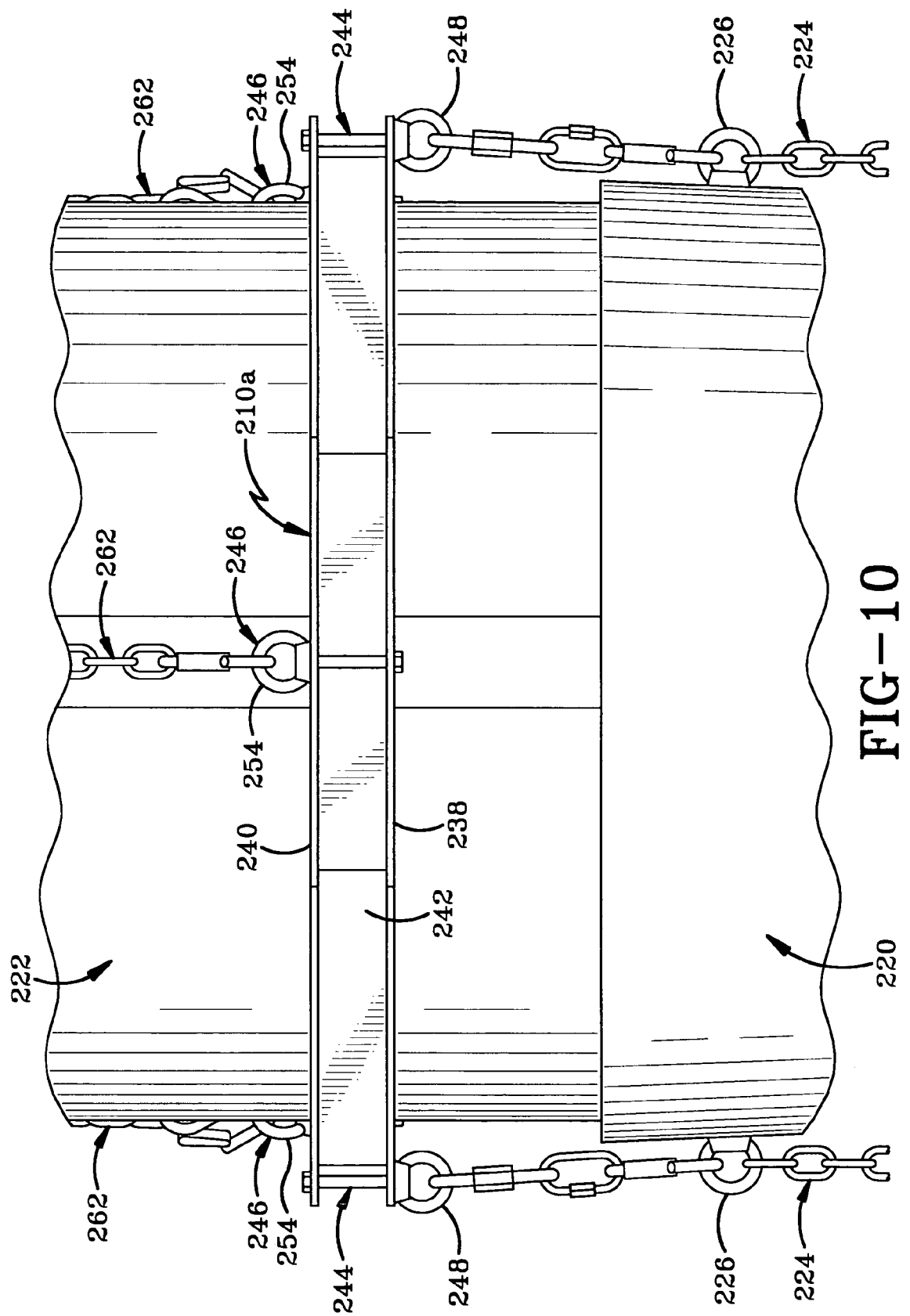
FIG. 10 is a front view of the chute transition frame through line 10-10 of FIG. 9.

FIGS. 8-10 illustrates an instance where the chute system 212 comprises at least one rolled section 222 that is secured to a transition frame 210 connected to a support system 214 in the same manner as described with reference to the system 112 described above. However, a second transition frame 210a is connected to the three chains 262 that hang downwardly from links 260 disposed on the outer peripheral wall of rolled section 222. Second transition frame 210a is inverted so that second wall 240 is disposed above first wall 238. Consequently, eye portions 254 of second connectors 246 extend upwardly and away from second transition frame 210a. Chains 262 are secured to the three second connectors 246 so that second transition frame 210a is suspended from chains 262. Eye portions 248 of first connectors 244 extend downwardly away from the downwardly facing first wall 238. The two first connectors 244 extend downwardly and outwardly away from first wall 238 and are connected to eyenuts 226 that project from the outer wall of molded section 220. Consequently, molded section 220 is suspended from second transition frame 210a. Chains 224 extend downwardly from eyenuts 226 and additional molded sections may be suspended from molded section 220 by hooking chains 224 to eyenuts disposed on the outer walls of subsequent molded sections.

It will be understood that the connectors that link the transition frame, chains, eyenuts and plated links can be of any suitable type and the selection of the type of connector for a particular connection can be changed without departing from the spirit of the present invention. Consequently, any type or number of S-hooks, link connectors, welded links or any other mechanisms can be utilized at any of the connectors between the various components of the chute system.

It will be understood that when chains 24 support a load, the load is transmitted from chains 24 through transition frame 10 to chains 32. Similarly, when chains 32 support a load, that load is transmitted from chains 32 through transition frame 10 and to chains 24. Thus, the transition frame of the present invention allows for the connection of various chain configurations for supporting a single load.

Furthermore, while transition frames 10, 110 and 210 are illustrated as having two first connectors and three second connectors thereon, more than two first connectors and more than three second connectors could be provided thereon without departing from the spirit of the present invention. It is also desirable that the number of connectors on the first wall differs from the number of connectors on the second wall. Similarly, while only two chains are secured to molded sections 20 and three chains are secured to rolled sections 22, it will be understood that more than two chains could be used to secure molded sections to a support system or to a transition frame. More than three chains could be used to secure rolled sections to either one of a support system or a transition frame without departing from the spirit of the present invention. The general configuration of the connectors and chains preferably should be such that the molded sections and rolled sections are balanced and are not tilted in a manner that will apply undue stress to the system.

As described herein, transition frame 10 comprises a substantially C-shaped channel (when viewed in cross-section). Consequently, either first wall 38 of transition frame 10 comprises the uppermost surface of frame 10 and second wall 40 comprises the lowermost surface of frame 10 (as is shown in FIG. 4). If the frame is flipped over as is shown in FIGS. 9 & 10, then first wall 238 comprises the lowermost surface and second wall 240 comprises the uppermost surface of the frame. The first and second connectors 44, 46 therefore extend generally vertically from one of the uppermost or lowermost surfaces of the transition frame. However, it is to be understood that the first and second connectors 44, 46 could alternatively extend outwardly and generally horizontally from a single vertically-oriented wall, such as intermediate wall 42. In this latter instance, first and second connectors 44 and 46 could be alternated at intervals along the same surface, such as intermediate wall 42, being spaced in a manner suitable to allow chains 24 and 32 to be positioned appropriately to support molded sections 20 or rolled sections 22 therefrom.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of the invention is an example and the invention is not limited to the exact details shown or described.

The invention claimed is:

1. The chute system comprising:
   a support structure;
   a plurality of chute sections, disposed relative to each other to form a column of chute sections and defining a debris-transmitting chute therethrough;
   a transition frame disposed between the support structure and the plurality of chute section; said transition frame comprising:
   a base;
   an opening formed in said base and being configured to receive at least a portion of one of the chute sections therethrough;
   a first plurality of connectors disposed on the base;
   a second plurality of connectors disposed on the base; wherein the first plurality of connectors differs in number and configuration from the second plurality of connectors;
   a first plurality of chains connectable to the first plurality of connectors and to one of the support structure and chute sections;
   a second plurality of chains connectable to the second plurality of connectors and to the other of the support structure and chute sections; and wherein the chute sections comprise one or more molded sections and one or more rolled sections; and wherein the first plurality of chains extend between one of the molded sections and the transition frame and the second plurality of chains extend between the transition frame and the rolled sections.

2. The chute system as defined in claim 1, wherein two chains extend between one of the molded sections and the transition frame and three chains extend between the transition frame and the rolled sections.

3. The chute system as defined in claim 2, wherein the molded sections are disposed above the rolled sections and the transition frame is disposed intermediate the molded sections and the rolled sections.

4. The chute system as defined in claim 2, wherein the rolled sections are disposed above the molded sections and the transition frame is disposed intermediate the rolled sections and the molded sections.

5. The chute system comprising:
   a support structure;
   a plurality of chute sections, disposed relative to each other to form a column of chute sections and defining a debris-transmitting chute therethrough;
   a transition frame disposed between the support structure and the plurality of chute section; said transition frame comprising:
   a base;
   an opening formed in said base and being configured to receive at least a portion of one of the chute sections therethrough;
   a first plurality of connectors disposed on the base;
   a second plurality of connectors disposed on the base; wherein the first plurality of connectors differs in number and configuration from the second plurality of connectors;
   a first plurality of chains connectable to the first plurality of connectors and to one of the support structure and chute sections;
   a second plurality of chains connectable to the second plurality of connectors and to the other of the support structure and chute sections; and, wherein the chute sections comprise two or more rolled sections that sleeve into each other and thereby form a column of rolled sections; and wherein the first chains extend between the supporting structure and the transition frame and the second chains extend between the transition frame and at least one of the rolled sections.

6. The chute system as defined in claim 5, further comprising a hopper connected to the support structure and disposed so as to allow debris dropped therein to enter an uppermost one of the plurality of chute sections.

* * * * *